United States Patent
Liu et al.

(10) Patent No.: US 7,107,237 B2
(45) Date of Patent: Sep. 12, 2006

(54) METHOD, APPARATUS, AND ARTICLE OF MANUFACTURE FOR EXECUTING A STATEMENT TO MANIPULATE DATA

(75) Inventors: Regina J. Liu, San Jose, CA (US); Maureen M. McDevitt, San Jose, CA (US); Roy L. Smith, San Jose, CA (US); Jerome Q. Wong, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 09/771,519

(22) Filed: Jan. 24, 2001

(65) Prior Publication Data
US 2002/0099559 A1 Jul. 25, 2002

(51) Int. Cl.
*G06Q 30/00* (2006.01)
*G06F 7/00* (2006.01)
(52) U.S. Cl. .............................. 705/27; 707/1
(58) Field of Classification Search .................. 705/26, 705/27; 707/1
See application file for complete search history.

(56) References Cited

U.S. PATENT DOCUMENTS

| | | | | |
|---|---|---|---|---|
| 5,758,337 A | * | 5/1998 | Hammond | 707/6 |
| 6,101,482 A | * | 8/2000 | DiAngelo | 705/26 |
| 6,101,483 A | * | 8/2000 | Petrovich | 705/26 |
| 6,466,943 B1 | * | 10/2002 | Craig | 707/102 |
| 6,631,381 B1 | * | 10/2003 | Couch et al. | 707/102 |
| 6,694,306 B1 | * | 2/2004 | Nishizawa et al. | 707/3 |

FOREIGN PATENT DOCUMENTS

EP 332556 A2 * 9/1989

OTHER PUBLICATIONS

Haas, LM: "Caching and Recovery of Catalog Informatin in Distributed Query Compilation"; Jan. 1, 1985.*
"Elimination of Lock Contention in Relational Databases", IBM Technical Disclosure Bulletin, v31, i1, pp. 180-185, Jun. 1988.*

* cited by examiner

*Primary Examiner*—Jeffrey A. Smith
(74) *Attorney, Agent, or Firm*—Sughrue Mion, PLLC

(57) ABSTRACT

A catalog management system for executing a statement that accesses a catalog to manipulate referenced system or user-defined objects and related data. Initially, a statement for a transaction to operate on an object is received. A private copy of the structure of a catalog is created to record information about the object used by the transaction. Then, the private copy of the structure of the catalog is used for the during the transaction to access the object.

63 Claims, 5 Drawing Sheets

METHOD, APPARATUS, AND ARTICLE OF MANUFACTURE FOR EXECUTING A STATEMENT TO MANIPULATE DATA

BACKGROUND OF THE INVENTION

1. Field of the Invention

This invention relates in general to computer-implemented database systems, and, in particular, to a technique for increasing the efficiency of executing multiple application processes when the application processes require access to the same meta data or definitional data such as in a database catalog table.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages to manipulate the data.

SQL has three components which enable databases to be created and manipulated. One of these components is the Data Definition Language (DDL). DDL provides the language to define objects which make up the database. In other words, DDL provides the ability to create, change, and delete objects including, for example, a table with corresponding SQL statements such as CREATE, ALTER and DROP statements, or other similar statements that perform these functions.

The definitions for SQL provide that a RDBMS should respond to a particular query with a particular set of data given a specified database content, but the technique that the RDBMS uses to actually find the required information in the tables on the disk drives is left up to the RDBMS. Typically, there will be more than one technique that can be used by the RDBMS to access required data. The RDBMS will optimize the technique used to find the data requested in a query in order to minimize the computer time used and, therefore, the cost of doing the query.

Within relational databases, such as the DB2® Database Management System from International Business Machines, Corporation, there are databases which may be accessed and modified by end users and databases which are system databases. System databases may or may not be available to a user. A catalog is an example of a system database. A catalog is a collection of tables that contains descriptions and definitions of these objects (e.g., tables, views and indexes). These objects may be system defined and/or user defined. Each catalog table may serve as a directory for the location of objects and related data which is needed by application processes or transactions (i.e., units of work; an application process may invoke multiple transactions). A catalog may include one or more catalog tables, and each catalog table may include descriptions of both system objects and user-defined objects. Thus, catalog tables of the catalog may be accessed by both the system and end users depending on particular needs.

When, for example, an application process or a transaction requests a table holding data (i.e., a data table) that is to be accessed by the application process or transaction, the transaction may need to refer to a catalog table for information relating to that particular data table. In order to access the contents of the catalog table, the transaction obtains a lock on the catalog table. Locks may be non-exclusive or exclusive and are used to maintain integrity of data within catalog tables, as well as, the data table. In other words, the catalog table may be "checked out" by the transaction. When a transaction is creating/defining, changing, or deleting objects, the transaction, through a DDL statement, may place an exclusive lock on the catalog table, as well as the object, such that other transactions can not access or utilize the catalog table, the object, or related object information.

A non-exclusive lock may be utilized when, for example, a first transaction accesses the catalog table to read data about a table or table data. In this case, the contents of the catalog table are not being changed, and therefore, a second transaction may be permitted to read data from the catalog table and/or the data table, but neither transaction may record new data to the catalog table or possibly the data table. Thus, non-exclusive locks may permit multiple transactions to read data from a catalog table. However, non-exclusive locks are not typically used when transactions create, delete, or alter the description or contents of a catalog table or data tables and their data such that the changes are intended to be permanent.

An exclusive lock may be used when, for example, a first transaction accesses a catalog table to create/define, change, or delete a data table, and the first transaction must record new information back to the catalog table. In this instance, the exclusive lock may prevent other transactions from accessing the catalog table, as well as, the data table. As a result, only the first transaction may access the catalog table and possibly the data table, and all other subsequent transactions must wait to access the catalog table and data table, even for non-exclusive access, until after the first transaction has completed its use of the corresponding table, data table, or related data. Thus, placing an exclusive lock on the catalog table ensures that other transactions do not attempt to update the catalog table, data table, or related data at the same time as the first transaction. Further, exclusive locks ensure that subsequent transactions will access the most recent or updated data provided by the first transaction.

In conventional systems, when a second transaction requests exclusive or nonexclusive access to the catalog table, data table, or related data exclusively locked by the first transaction, lock contention occurs. In other words, the second transaction must wait until the first transaction finishes using the catalog table, data table, or any related tables and table data after which time the locks may be released. When the locks are released, the second transaction may access the catalog table to locate a data table or related information. As a result, each transaction that must access that catalog table and/or data table following a prior transaction that is exclusively utilizing that catalog table and/or data table must wait until the prior transaction no longer requires such exclusive use. Consequently, transactions require more time to process, processing costs are increased, and system performance is diminished.

Thus, there is a need in the art for a technique that enables concurrent transactions to utilize the same catalog table to obtain, create/define, change, or delete a private and/or non-private object and/or its data such that transactions, processing times, and processing costs are minimized.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for utilizing private, temporary catalog tables.

In accordance with the present invention, a statement for a transaction involving operations on a table or other object is received. A private catalog for recording information about the objects is generated. Then, the private catalog is used during the transaction to access the objects.

BRIEF DESCRIPTION OF THE DRAWINGS

Referring now to the drawings in which like reference numbers represent corresponding parts throughout.

DETAILED DESCRIPTION

In the following description, embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Environment

Figure 1:
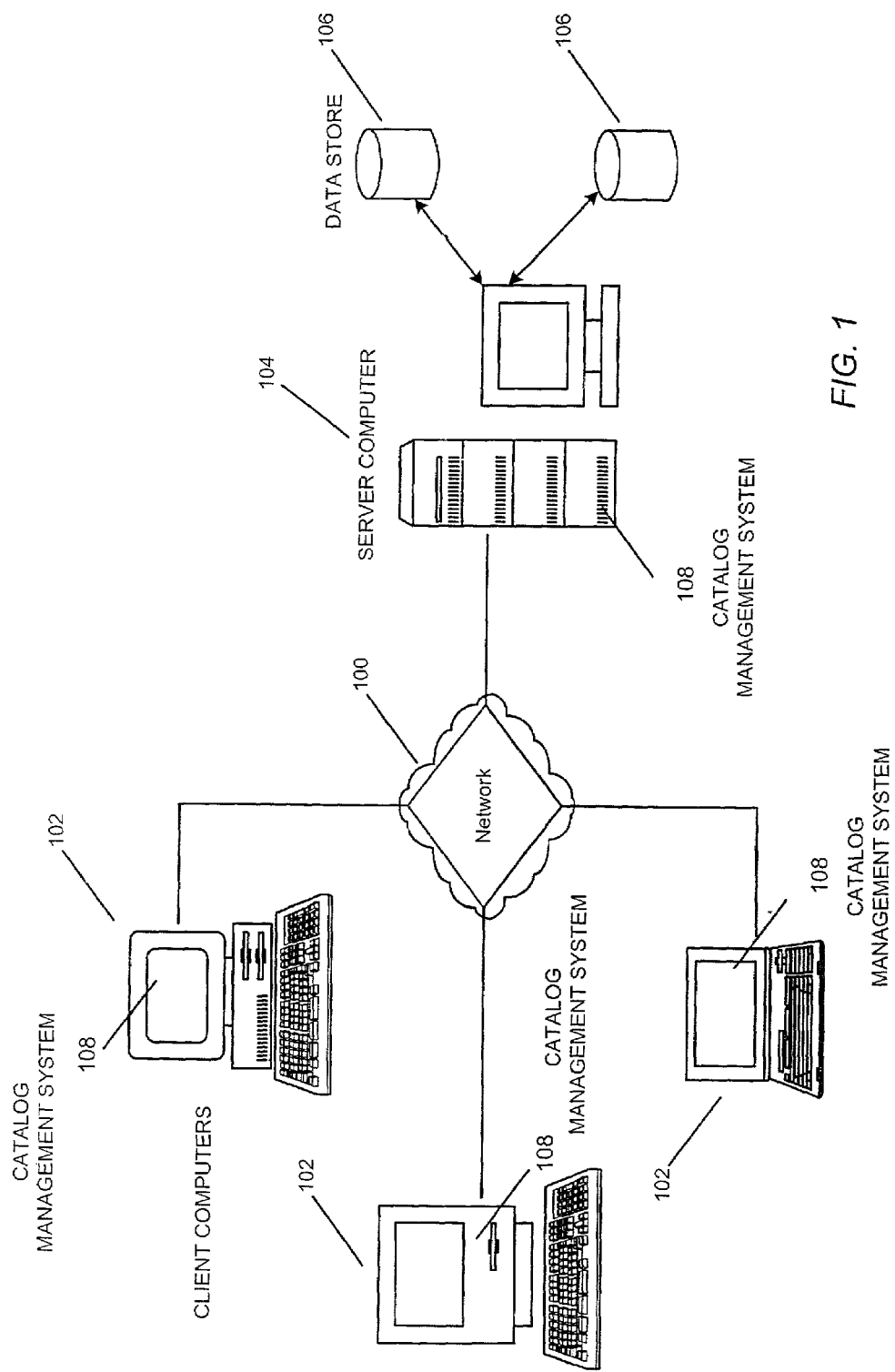
FIG. 1 schematically illustrates a hardware environment of an embodiment of the catalog management system.

FIG. 1 schematically illustrates a hardware environment of an embodiment of the present invention, and more particularly, illustrates a typical distributed computer system using the network 100 to connect client computers 102 executing client transactions or applications to a server computer 104 executing software and other computer programs, and to connect the server system 104 to data sources 106.

A typical combination of resources may include client computers 102 that are personal computers or workstations, and a server computer 104 that is a personal computer, workstation, minicomputer, or mainframe. These systems are coupled to one another by various networks, including LANs, WANs, and the Internet. The data sources 106 may be geographically distributed.

A client computer 102 typically executes a client transaction and is coupled to a server computer 104 executing server software. The client transaction program is typically a software program which can include, inter alia, multimedia based transactions, e-mail transactions, e-business transactions, or workflow transactions. The server computer 104 also uses a data source interface and, possibly, other computer programs, for connecting to the data sources 106. The client computer 102 is bi-directionally coupled with the server computer 104 over a line or via a wireless system. In turn, the server computer 104 is bi-directionally coupled with data sources 106.

The computer programs executing at each of the computers are comprised of instructions which, when read and executed by the computers, cause the computers to perform the steps necessary to implement and/or use the catalog management system 108. Generally, computer programs are tangibly embodied in and/or readable from a device, carrier, or media, such as memory, data storage devices, and/or data communications devices Under control of an operating system, the computer programs may be loaded from the memory, data storage devices, and/or data communications devices into the memory of each computer for use during actual operations.

Thus, the catalog management system 108 may be implemented as a method, apparatus, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media, including the internet. Of course, those skilled in the art will recognize that many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention. For example, the system described can apply either to a general-purpose computer or to a special-purpose system.

Non-Persistent Non-Shareable System Database Instance for a Single Invocation of an Application Process in a Relational Database Management System One embodiment of the present invention provides a catalog management system 108. The catalog management system 108 creates a non-persistent, non-shareable system database instance for a single invocation of an application process in a RDBMS. In other words, the catalog management system 108 provides each application process or transaction invoked by a user with its own private, temporary copy of the structure of the catalog which may be used to store, describe, and/or locate objects such as tables or related object data. These objects may be private, non-private, system defined, or user defined. Although the catalog management system 108 may be utilized with various objects, for simplicity, the specification will describe the invention while referring to tables and related data. However, one skilled in the art would recognize that the catalog management system 108 can be utilized with objects other than tables.

An application process is a program or group of programs designed for end users. An application process may invoke one or more statements or transactions, each of which performs a unit of work on, for example, one or more objects. A catalog is a collection of catalog tables, and catalog tables may relate to or include descriptions of both system objects and user-defined objects that may be processed by transaction. These objects may be private, non-private, system defined, or user-defined. Each catalog table of the catalog refers to or serves as a directory for tables, other objects, and object information. For example, a transaction may access a catalog table to determine the location of a required table, data or other attributes of the requested table such as size, number of rows, number of columns, access privileges, etc.

In the DB2® Database Management System from International Business Machines, Corporation, for example, each DB2® system or database ensures that each catalog table of the catalog contains accurate descriptions of the objects that the DB2® system controls. Catalog tables are similar to other database tables, however, DB2® system catalog tables are system tables stored in system databases and are designated as "SYSIBM", as compared to user databases, which are not primarily intended for use by a DBMS. In the DB2® system, a catalog may include, a collection of catalog tables. For example, a catalog may include a collection of catalog tables including, but not limited to, SYSINDEXES, SYSTABAUTH, SYSTABLES, SYSVIEWS, SYSCOLUMNS, SYSDATABASE, and SYSTABLESPACE of the DB2® system. Those skilled in the art will recognize that other or additional DB2® system catalog tables may be utilized. Indeed, those skilled in the art will recognize that catalog tables from other database management systems may also be utilized. Thus, the previously listed catalog tables merely serve as illustrative examples.

Each transaction may require different catalog tables, objects, and/or related object information, or need to populate a catalog table with data relating to an object for future transactions. Thus, each transaction may request different catalog tables which refer to the relevant object or object information. For example, if a transaction requires information relating to the number of columns in a table, then the transaction could access the DB2® system SYSIBM.SYSTABLES catalog table to obtain this information as well as information relating to the name of the table, the name of the database that contains the table space, the name of the table space that contains the table, the number of rows in a table, etc. In addition, this information from SYSIBM.SYSTABLES catalog table also provides the transaction with the location of the requested table. The transaction may then perform the necessary processing using the table and use the catalog table to store information about changes to the table, its description, and/or related data.

More specifically, a transaction may require a table and/or related table data when the transaction creates, deletes, alters, or simply accesses a table. These operations are performed using Standard Query Language (SQL) statements. SQL is a well known query language relating to relational databases. SQL is comprised of three different query components, one of which is the Data Definition Language (DDL). DDL provides the language to define the objects which make up a database. More specifically, DDL statements provide the ability to create, change, and delete any object with corresponding SQL statements.

All SQL programs execute as part of an application process or transaction. A transaction invoked by an application process is the unit to which the DB2® system allocates resources and locks. In conventional systems, when a transaction executes a DDL statement and the statement accesses a catalog table to create/define, change, or delete a data table or data table information, the DDL statement places an exclusive lock on the catalog table and the data table requested by the transaction. If a second transaction needs the same catalog table and/or data table, then the second transaction must wait for the first transaction to release the lock on the catalog table and/or data table. That is, each transaction attempts to place an exclusive lock on the catalog table and/or data table such that only a single transaction accesses the catalog table and/or data table.

Overcoming previously described shortcomings of conventional systems, the catalog management system 108 increases system efficiency and minimizes lock contention between transactions by generating a non-persistent, non-shareable system database instance for each invocation of an application process. In other words, the catalog management system 108 provides the necessary catalog tables, as well as private and/or non-private objects, to each transaction without incurring lock contention inherent in conventional systems. As a result, each transaction can populate the structure of the private catalog with private and/or non-private object data specifically directed to each transaction. The embodiments described below illustrate the present technique in detail.

Figure 2:
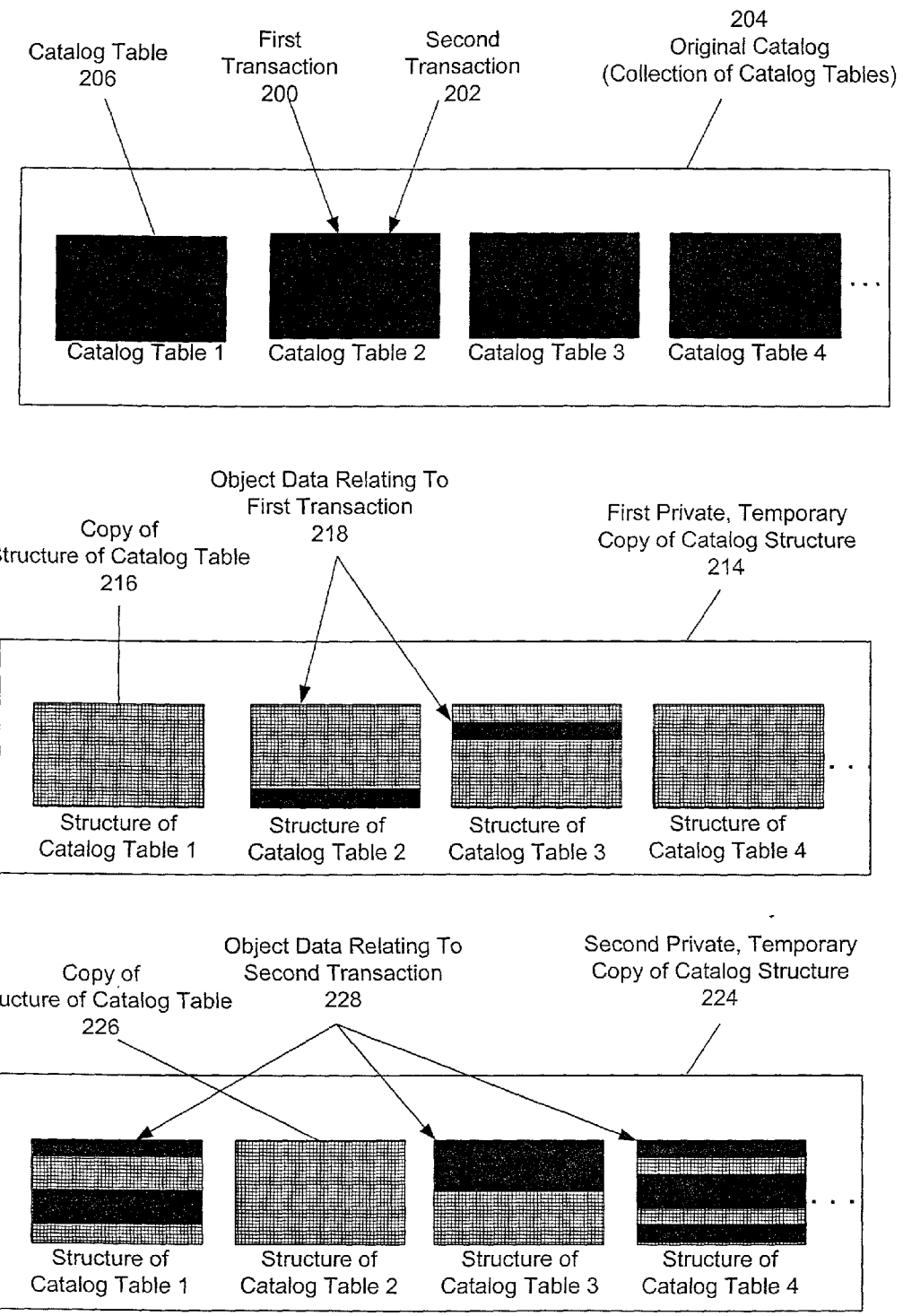
FIG. 2 schematically illustrates how an embodiment of the catalog management system creates a private, temporary copy of the structure of a catalog for each concurrent transaction.

FIG. 2 Schematically illustrates one embodiment of the catalog management system 108. Initially, a first application process or first transaction 200 and a second application process or second transaction 202 access the catalog 204. The catalog 204 is an original collection of individual catalog tables 206. Each catalog table 206 may describe both system objects and user-defined objects, and these objects may be private and/or non-private objects. For purposes of illustration, catalog tables 206 are filled in to represent that they are populated with descriptions of system and/or user objects, private and non-private, and data. Transactions 200 and 202 utilize one or more individual catalog tables 206 and/or one or more user-defined objects within the catalog 204 to store information about a private or non-private object or to locate and retrieve a private or non-private object.

The catalog management system 108 increases efficiency and avoids contention for the same catalog table 206 and for private and/or non-private objects with the same names between concurrently executing transactions by creating private copies of the structure of the original catalog 204. In other words, a first private copy of the catalog structure 214 is created for the first transaction 200, a second private copy of the catalog structure 224 is created for the second transaction 202, and so on for each transaction. In one embodiment, each private copy of the catalog structure incorporates the underlying structure and, optionally, system data of the original catalog 204. In other words, each private copy of the catalog structure incorporates the structure and, optionally, system data of one or more or all of the individual catalog tables, e.g., 216 and 226. For purposes of illustration, some copies of the structure of catalog tables 216 and 226 are partially filled in to represent that they may or may not be populated with different amounts of system or user-defined object data 218 and 228.

With this technique, a specific transaction is associated with a specific copy of a catalog 204. A first private copy of the catalog structure 214 is associated with the first transaction 200, and a second copy of the catalog structure 224 is associated with the second transaction 202. The associations may be permeated through table identification attributes such as, for example, definition and description fields nested throughout different copies of the structure of the catalog tables 216 and 226. Identification attributes identify the transactions associated with the private catalog 214 and 224 copies and may be received from, for example user input or a system. Thus, the first transaction 200 and second transaction 202 may execute simultaneously with respective private, temporary copies of the catalog structure 214 and 224, without regard to how the other transaction manipulate data.

For example, assume that two transactions require a global user-defined object, Global Object A, within the original catalog 204. Further assume that Global Object A is configured with five columns. Global Object A can be shared among different users.

Conventional systems, in handling user-defined global objects, enable these objects to be shared at the expense of flexibility. Global Object A may be shared among multiple transactions or users, but all users are bound by the same definition of the object for that given name (i.e., Global Object A). Thus, with conventional systems, all users or transactions are required to use Global Object A in the exact same manner, and all users or transactions are limited to utilizing Global Object A defined as having five columns.

With the catalog management system 108, however, private user-defined-objects of the same name can have different descriptions since each user or transaction is allocated a private copy of the catalog 204. As a result, catalog copy 214 may include Object A with 20 columns, and catalog copy 224 may include Object A with 100 columns, and so on for different catalog copies. Thus, the catalog management system 108 provides a more flexible environment than conventional systems.

Figure 3:
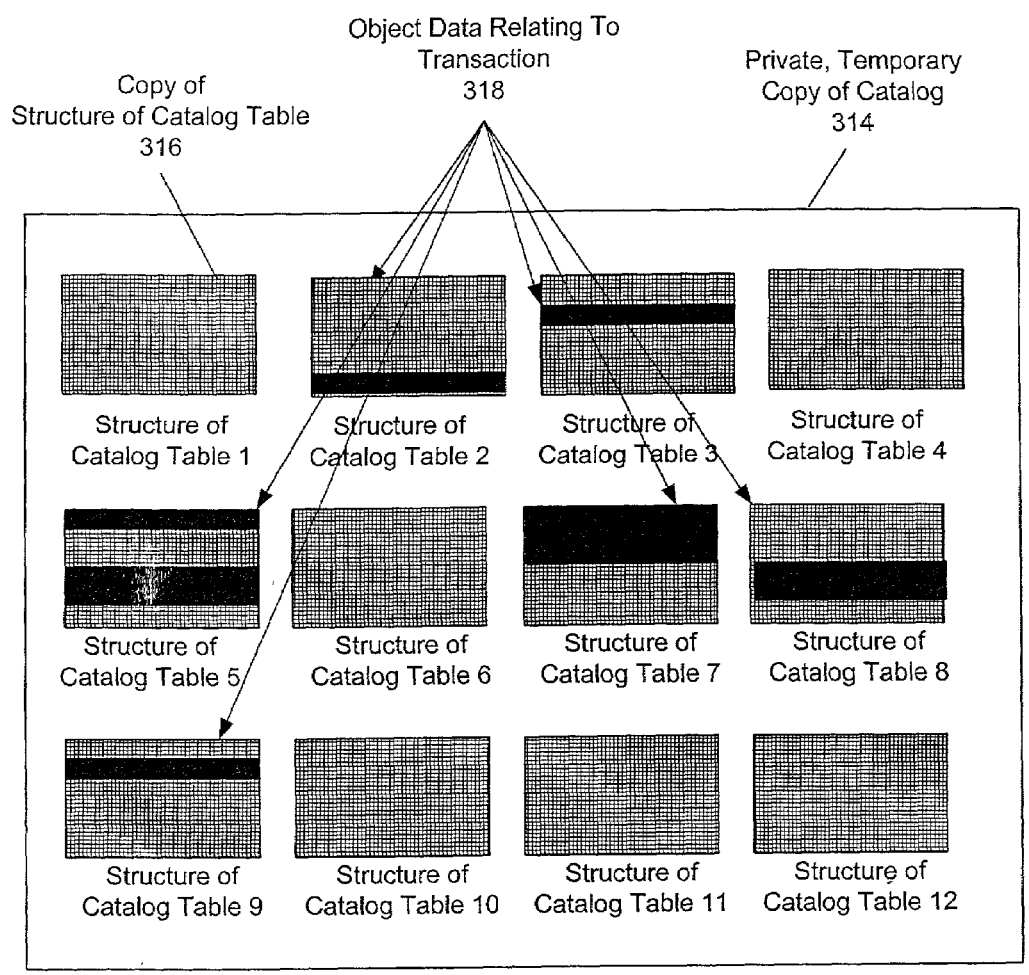
FIG. 3 schematically illustrates how an embodiment of the catalog management system creates a private, temporary copy of the structure of a catalog and populates one or more or all of the copies with object data as needed.

FIG. 3 schematically illustrates an alternative embodiment of the catalog management system 108. More specifically, a private, temporary copy of the catalog structure 314 may include any number of copies of the structure of individual catalog tables 316, each of which may include descriptions of both system objects and/or user-defined objects which may be private and non-private. For example, FIG. 3 illustrates that the private, temporary copy of the catalog structure 314 may include copies of the structure of twelve different catalog tables 316. The alternative embodiment further illustrates that one or more or all of the copies of the structure of the catalog tables 316 may be populated with system or user-defined object data 318 relating to a transaction.

Figure 4:
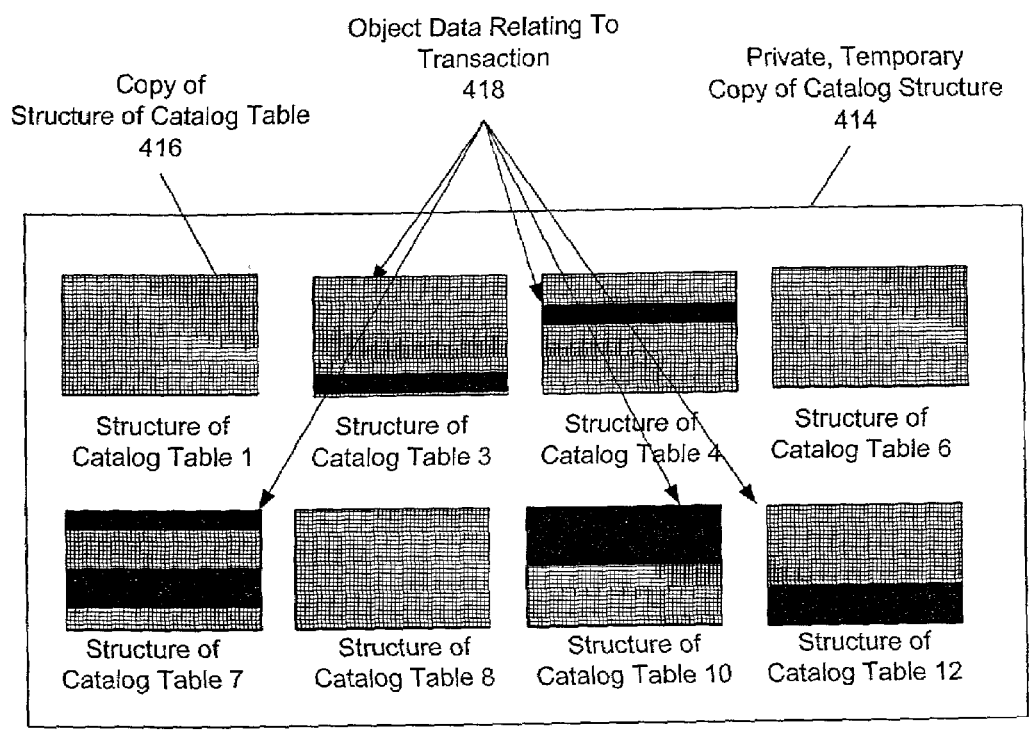
FIG. 4 schematically illustrates how an embodiment of the catalog management system creates private, temporary copies of the structure of selected catalog tables and populates one or more or all of the copies with object data as needed.

FIG. 4 schematically illustrates yet another alternative embodiment of the catalog management system 108. A private catalog 414 may include copies of the structure of selected catalog tables 416, each of which may include descriptions of both system objects and user-defined objects, which may be private and non-private. For example, the selected catalog tables 416 may include catalog tables 1, 3, 4, 6, 7, 8, 10 and 12 instead of all of catalog tables 1–4, 1–12 or however many catalog tables a catalog 414 may contain. One or more or all of the copies of the selected catalog tables 1,4, 6, 7, 8, 10 and 12 may include descriptions of both system objects and user-defined objects. Those skilled in the art will readily recognize that the private catalog may include copies of the structure of various catalog tables.

Figure 5:
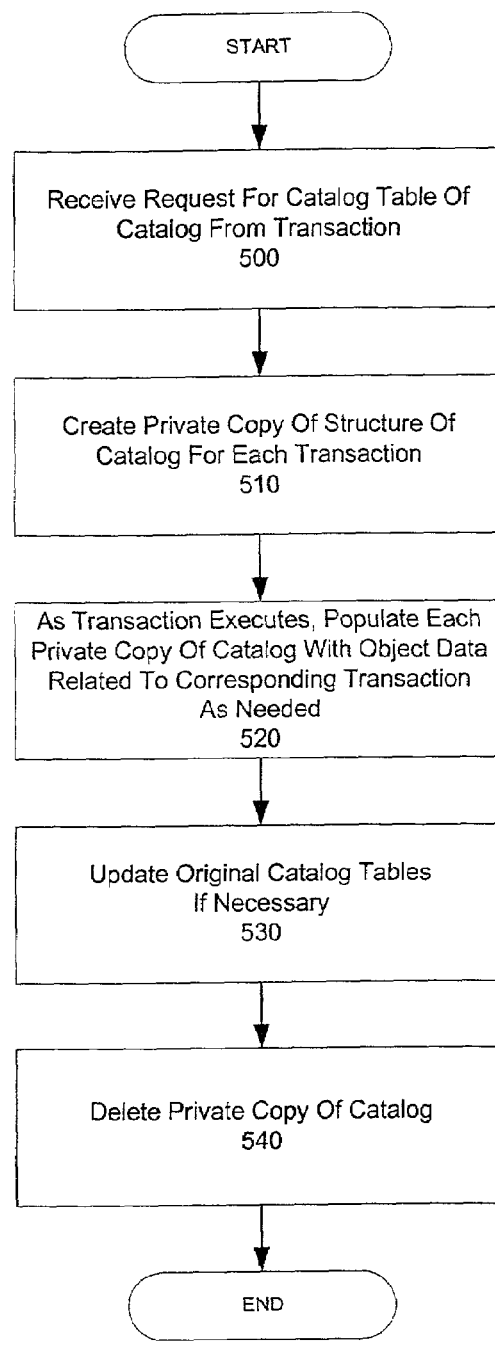
FIG. 5 is a flow diagram of tasks performed by an embodiment of the catalog management system.

FIG. 5, a flow diagram illustrating steps performed by one embodiment of the catalog management system 108, illustrates how the framework illustrated in FIGS. 2 and 3 is implemented.

Initially, in block 500, the catalog management system 108 receives a request from a first transaction 200 to access a catalog table 206 of the catalog 204. Each catalog table 206 of the catalog 204 may include descriptions of both system objects and user-defined objects, which may be private and non-private. The request may relate to, for example, utilizing a catalog table 206 to locate a data table or to retrieve data relating to a data table. The catalog management system 108 may also receive a similar request for the same catalog table 206 from a second transaction 202 executing concurrently with the first transaction 200.

In block 510, the catalog management system 108 creates private copies of the structure of the catalog 214 and 224 for each transaction 200 and 202. In one embodiment, each private catalog is utilized exclusively by one transaction. In other words, the catalog management system 108 copies the structure of one or more or all of the individual catalog tables 216 and 226 of the original catalog 204 for each transaction 200 and 202 respectively. A first copy of the catalog structure 214 is created for the first transaction 200, and a separate, private copy of the catalog structure 224 is created for the second transaction 202. The following pseudocode examples illustrate how private copies of the catalog structure 214 and 224 may be generated The following pseudocode serves as an example of how a table is defined as private to a transaction.

SQL_define_private TABLE A with columns
  (DEPTNO CHAR (3),
  (DEPTNAME VARCHAR (36),
  MGRNO CHAR (6),
  LOCATION CHAR(16))

This pseudocode example illustrates one manner in which the catalog management system 108 implicitly and automatically generates the private copies of the catalog structure 214 and 224 when this pseudocode SQL is executed. The implicit generation of the private catalog copy being requested is represented by the "private" attribute in the definition of Table A.

As a second example, the following pseudocode SQL illustrates an additional way for the catalog management system 108 to implicitly and automatically generate private copies of the catalog structure:

SQL_add private_rows to non-private TABLE B
  data as ('SMITH', 'JOHN', DEPT 10', 34,
    'PROGRAMMER', '1998-08-10')

In this second example, the pseudocode SQL represents adding private rows to a non-private table, but only the transaction adding the rows has access to those rows. The implicit generation of the private catalog copy being requested is represented by the "private" attribute of the request which adds rows to the non-private table.

Those skilled in the art will recognize that the catalog management system 108 can also create private, temporary copies of the structure of the original catalog before a transaction requests the catalog 204 or related catalog table 206, and then allocate a private catalog structure copy to that application. In other words, the present invention can be applied to applications which create a potential for lock contention or actual lock contention, such that the potential or actual lock contention is minimized or eliminated.

An advantage of the catalog management system 108 is that it reduces or eliminates the potential for lock contention.

Potential lock contention may exist whenever any single application process is invoked since there is a possibility that a subsequent transaction may request the same catalog table and/or the same named data table as a previous transaction. In this instance, a private, temporary copy of the structure of the catalog 204 is generated for any and all transactions such that lock contention is minimized or eliminated.

In an alternative embodiment, the catalog management system 108 creates a non-persistent, non-shareable system database instance for some, but not all transactions that are executing concurrently. Thus, instead of generating a private, temporary copy of the catalog table for each transaction, the catalog management system 108 may create a private, temporary copy of the catalog table only for transactions that request the same catalog table. For example, a first transaction may request a first catalog table to access a first data table. Second, third, fourth and fifth transactions may all request different catalog tables to request different or same named data tables. A sixth transaction, which is concurrently processing with the first transaction, may request the same catalog table as the first transaction since the sixth transaction may require the same named data table as the first transaction. Actual lock contention occurs when the sixth transaction requests the same catalog table as the first transaction. In this case, instead of generating a private copy of catalog tables for each of the six transactions, the alternative embodiment is directed to creating a private, temporary copy of the catalog for the sixth transaction if the catalog management system 108 is associated with both the first transaction and the sixth transaction.

After creating copies of the structure of the catalog, the catalog management system 108 proceeds to block 520. In block 520, as each transaction executes, the private copies of the catalog structure 214 and 224, which describe system objects and/or user-defined objects, are populated with corresponding system and/or user-defined object data 218 and 228 related to the transaction. In one embodiment of the present invention, the private catalog is used to record only information about tables accessed by the transaction. For example, a first private copy of the catalog structure 214 may be populated, with system data 218 related to the first transaction 200, and a second copy of the catalog structure 224 may be populated, with user-defined data 228 related to the second transaction 202. However, as illustrated in FIG. 2, one or more or all of the copies of the structure of each catalog table may be populated with system and/or user-defined data. Thus, the first transaction 200 may populate the copies of the structure of the second and third catalog tables with specific object data 218 whereas the second transaction 202 may populate copies of the structure of the first, third and fourth catalog tables with different object data 228. Thus, transactions can populate the structure of any number of catalog tables with any amount or type of object data as necessary providing enhanced flexibility and options in processing transactions.

Further, the catalog management system 108 may be configured such that a transaction can access an additional object, such as an additional table. In this case, in addition to using the private catalog table 204 to record information about the first table, the private catalog table 204 may also record information about the additional table.

In block 530, after the transactions 200 and 202 have executed, one or more rows of data of one or more original catalog tables 206 are updated, if necessary, to reflect the results of an executed transaction. For example, if the DDL statement "ALTER" was used to change the number of columns in a table from 50 to 30, and this change was intended to alter the catalog table 206 permanently for future transactions, then the catalog management system 108 may record the changes to the corresponding catalog table 206. Otherwise, the catalog management system 108 may proceed to block 540.

In block 540, the catalog management system 108 deletes the private copies of the catalog structure 214 and 224 and objects as needed. For example, the private catalog may utilized for the duration of the transaction to access objects, and the first private copy of the catalog structure 214 may be deleted after the transaction 200 has executed. In an another alternative embodiment, the first private copy of the catalog structure 214 may be deleted after object data referenced in the catalog structure 214 is no longer needed. For example, if transaction 200 no longer requires the first private copy of the catalog structure 214 or any references tables or table data, then the private copy of the catalog structure 214 may be deleted even if transaction 200 is still executing. In yet another alternative embodiment, the first private copy of the catalog structure 214 may be deleted after a user-defined amount of time. In an additional alternative embodiment, the first private copy of the catalog structure 214 may be deleted after a predetermined amount of time. Additionally, the private catalog tables may be deleted after a an amount of time required by a system.

Based on the forgoing description of alternative embodiments, one skilled in the art would recognize that the present invention may be used for any number of transactions in different situations. Thus, the previous description involving two transactions is merely illustrative of the many possible environments in which the present invention may be used.

Further, the forgoing description of the catalog management system illustrates that the limitations of conventional systems are overcome since each transaction may execute without waiting for prior transactions to release locks. As a result, the present invention minimizes lock contention, enables more transactions to be executed in a shorter period of time, reduces processing costs, and improves system performance.

CONCLUSION

The foregoing description of one embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing a statement to manipulate data stored in a data store connected to a computer, the method comprising:

receiving the statement for a transaction, wherein the statement operates on one or more objects;

in response to the receipt of the statement for the transaction, automatically generating a private catalog for the transaction to record information about the objects; and using the private catalog during the transaction to access the objects, wherein the generating of the private catalog comprises filling in records of the private catalog only with information that relates to tables accessed by the transaction and wherein the private catalog records that relate to tables not accessed by the transaction remain unfilled.

2. The method of claim 1, wherein the private catalog comprises a private copy of an original catalog, wherein the original catalog comprises one or more original individual catalog tables.

3. The method of claim 1, wherein the objects are private objects.

4. The method of claim 1, wherein the objects are non-private objects.

5. The method of claim 1, wherein the objects are user-defined objects.

6. The method of claim 1, wherein the objects are system objects.

7. The method of claim 1, wherein the private catalog comprises a temporary private catalog.

8. The method of claim 7, wherein the temporary private catalog is deleted from the data stored after a user-defined amount of time.

9. The method of claim 7, further comprising deleting the temporary private catalog from the data store after an amount of time required by a system.

10. The method of claim 7, wherein the temporary private catalog is deleted from the data store after a predetermined amount of time.

11. The method of claim 7, wherein the temporary private catalog is deleted from the data store after the transaction no longer requires object data.

12. The method of claim 7, wherein the temporary private catalog is deleted from the data store after the transaction executes.

13. The method of claim 1, wherein the private catalog is used exclusively by the transaction.

14. The method of claim 1, further comprising accessing an additional object.

15. The method of claim 14, wherein the private catalog records information about the additional object.

16. The method of claim 1, further comprising populating the private catalog with an identification attribute.

17. The method of claim 16, wherein the identification attribute comprises a description of the object used by the transaction.

18. The method of claim 16, wherein the identification attribute comprises a definition of the object used by the transaction.

19. The method of claim 1, wherein the statement comprises a data definition language statement.

20. An apparatus for executing a statement to manipulate data, comprising:
 a computer having a data store connected thereto, wherein the data store stores data; and
 one or more computer programs, performed by the computer, for receiving the statement for a transaction, wherein the statement operates on one or more objects; in response to the receipt of the statement for the transaction, automatically generating a private catalog for the transaction to record information about the objects; and using the private catalog during the transaction Ia access the objects,
 wherein said generating of the private catalog comprises filling in records of the private catalog only with information about tables accessed by the transaction and wherein the private catalog records remain untilled for information about tables not accessed by the transaction.

21. The apparatus of claim 20, wherein the private catalog, comprises a private copy of an original catalog, wherein the original catalog comprises one or more original individual catalog tables.

22. The apparatus of claim 20, wherein the objects are private objects.

23. The apparatus of claim 20, wherein the objects are non-private objects.

24. The apparatus of claim 20, wherein the objects are user-defined objects.

25. The apparatus of claim 20, wherein the object are system objects.

26. The apparatus of claim 20, wherein the private catalog comprises a temporary private catalog.

27. The apparatus of claim 26, wherein the temporary private catalog is deleted from the data store after a user-defined amount of time.

28. The apparatus of claim 26, further comprising deleting the temporary private catalog from the data store after an amount of time required by a system.

29. The apparatus of claim 26, wherein the temporary private catalog is deleted from the data store after a predetermined amount of lime.

30. The apparatus of claim 26, wherein the temporary private catalog is deleted from the data store after the transaction no longer requires object data.

31. The apparatus of claim 26, wherein the temporary private catalog is deleted from the data store after the transaction executes.

32. The apparatus of claim 20, wherein the private catalog is used exclusively by the transaction.

33. The apparatus of claim 20, further comprising accessing an additional object.

34. The apparatus of claim 33, wherein the private catalog records information about the additional object.

35. The apparatus of claim 20, further comprising population the private catalog with an identification attribute.

36. The apparatus of claim 35, wherein the identification attribute comprises a description of the object used by the transaction.

37. The apparatus of claim 35, wherein the identification attribute comprises a definition of the object used by the transaction.

38. The apparatus of claim 21, wherein the statement comprises a data definition language statement.

39. An article of manufacture comprising a computer program carrier readable by a computer and embodying one or more instructions executable by the computer to perform method steps for executing a statement to manipulate data, comprising:
 receiving the statement for a transaction, wherein the statement operates on one or more objects;
 in response to the receipt of the statement for the transaction, automatically generating a private catalog for the transaction to record information about the objects; and
 using the private catalog during the transaction to access the objects,
 wherein the generating of the private catalog comprises filling in the private catalog only with information about tables accessed by the transaction and leaving fields of the private catalog that relate to information about tables not accessed by the transaction blank.

40. The article of manufacture of claim 39, wherein the private catalog comprises a private copy of an original catalog, wherein the original catalog comprises one or more original individual catalog tables.

41. The article of manufacturing of claim 39, wherein the objects are, private objects.

42. The article of manufacture of claim 39, wherein the objects are non-private objects.

43. The article of manufacture of claim 39, wherein the objects are user-defined objects.

44. The article of manufacture of claim 39, wherein the objects are system objects.

45. The article of manufacture of claim 39, wherein the private catalog comprises a temporary private catalog.

46. The article of manufacture of claim 45, wherein the temporary private catalog is deleted from the data store after a user-defined amount of time.

47. The article of manufacture of claim 45, further comprising deleting the temporary private catalog from the data store after an amount of time required by a system.

48. The article of manufacture of claim 45, wherein the temporary private catalog is deleted from the data store after a predetermined amount of time.

49. The article of manufacture of claim 45, wherein the temporary private catalog is deleted from the data store after the transaction no longer requires object data.

50. The article of manufacture of claim 45, wherein the temporary private catalog is deleted from the data store after the transaction executes.

51. The article of manufacture of claim 39, wherein the private catalog is used exclusively by the transaction.

52. The article of manufacture of claim 39, further comprising accessing an additional object.

53. The article of manufacture of claim 52, wherein the private catalog records information about the additional object.

54. The article of manufacture of claim 39, further comprising populating the private catalog with an identification attribute.

55. The article of manufacture of claim 54, wherein the identification attribute comprises a description of the object used by the transaction.

56. The article of manufacture of claim 54, wherein the identification attribute comprises a definition of the object used by the transaction.

57. The article of manufacture of claim 39, wherein the statement comprises data definition language statement.

58. A method for executing a statement to manipulate data stored in a data store connected to a computer, the method comprising:
  receiving the statement for operating at least one object in the data store;
  in response to the receipt of the statement, automatically generating a private copy of system information for said at least one object;
  accessing said at least one object in the data store based on information in the generated private copy,
  wherein the private copy of the system information is a catalog table partially filled in only with the system information about said at least one object.

59. The method according to claim 58, wherein the system information is a system database.

60. The method according to claim 58, wherein the system information is a directory storing said at least one object's location in the data store and related data for access and manipulation of said at least one object.

61. The method according to claim 58, further comprising transferring changes made to the private copy of the system information into original system information data store.

62. The method according to claim 58, wherein the system information is a catalog and wherein the private copy of the catalog is generated only when an actual lock contention occurs.

63. The method according to claim 62, wherein the actual lock contention occurs when there is mote than one statement for operating on the same object in the data store.

* * * * *